(12) United States Patent
Miro Panades

(10) Patent No.: US 10,354,029 B2
(45) Date of Patent: Jul. 16, 2019

(54) METHOD FOR EQUIPPING REGISTERS OF AN INTEGRATED CIRCUIT TO DETECT TIMING VIOLATIONS

(71) Applicant: Commissariat à l'Énergie Atomique et aux Énergies Alternatives, Paris (FR)

(72) Inventor: Ivan Miro Panades, Grenoble (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 397 days.

(21) Appl. No.: 15/367,803

(22) Filed: Dec. 2, 2016

(65) Prior Publication Data
US 2017/0161416 A1    Jun. 8, 2017

(30) Foreign Application Priority Data

Dec. 4, 2015    (FR) ...................................... 1561879

(51) Int. Cl.
    *G06F 17/50*          (2006.01)
(52) U.S. Cl.
    CPC ...... *G06F 17/5031* (2013.01); *G06F 17/5036* (2013.01); *G06F 17/5072* (2013.01); *G06F 17/5077* (2013.01); *G06F 2217/78* (2013.01); *G06F 2217/84* (2013.01)
(58) Field of Classification Search
    CPC .. G06F 1/3203; G06F 1/3206; G06F 17/5031; G06F 17/5072
    See application file for complete search history.

(56) References Cited

U.S. PATENT DOCUMENTS

| 2000/0104561 | | 5/2008 | Carpenter et al. |
| 2009/0112557 | A1 | 4/2009 | King et al. |
| 2009/0206904 | A1 | 8/2009 | Shimura |
| 2013/0300463 | A1 | 11/2013 | Gemmeke et al. |

FOREIGN PATENT DOCUMENTS

| WO | WO 2010/122036 A1 | 10/2010 |
| WO | WO 2015/118145 A1 | 8/2015 |

OTHER PUBLICATIONS

French Search Report, dated Sep. 26, 2016, from corresponding or related French Application No. 15/61879.
Beigne et al.: "A 460 MHz at 397 mV, 2.6 GHz at 1.3 V, 32 bits VLIW DSP Embedding F MAX Trackin," (2015) IEEE Journal of Solid-State Circuits; pp. 128-136.
Yuji et al.: "Possibilities to miss predicting timing errors in canary flip-flops," (2011) Circuits and Systems (MWSCAS); pp. 1-4.

*Primary Examiner* — Vuthe Siek
*Assistant Examiner* — Aric Lin
(74) *Attorney, Agent, or Firm* — Wolf, Greenfield & Sacks, P.C.

(57) ABSTRACT

A method of circuit conception including performing static timing analysis on a circuit design to identify a first subset of the synchronous devices having at least one input path with a slack time below a first threshold; simulating the circuit design using one or more functional test patterns to identify a second subset of the synchronous devices for which the number of activations during the simulation is above a second threshold; selecting at least one synchronous device forming part of both of the first and second subsets; and modifying the circuit design to include, for each selected synchronous device, a detection circuit coupled to one or more inputs of the selected synchronous device.

12 Claims, 7 Drawing Sheets

METHOD FOR EQUIPPING REGISTERS OF AN INTEGRATED CIRCUIT TO DETECT TIMING VIOLATIONS

CROSS-REFERENCE TO RELATED APPLICATION

This application claims the priority to French patent application number 15/61879, filed Dec. 4, 2015, which is hereby incorporated by reference in its entirety to the maximum extent allowable by law.

FIELD

The present disclosure relates to the field of methods for the conception of integrated circuits, and in particular to a method of equipping registers of an integrated circuit with detection circuits to detect timing violations and improve performance.

BACKGROUND

In order to improve the performance of integrated circuits, it is generally desirable that the clock frequency is as high as possible while maintaining correct circuit functionality. Furthermore, to reduce energy consumption, it also desirable that the supply voltage of the circuit is as low as possible while maintaining correct circuit functionality. Beyond a certain operating point corresponding to a clock frequency and supply voltage limit, the circuit will no longer function correctly. There is however a technical difficulty in detecting when a clock frequency/supply voltage limit has been reached.

An integrated circuit will no longer maintain correct functionality if one or more of its synchronous devices are subjected to timing violations. Synchronous devices include registers, flip-flops, memories and latches. Such devices are generally characterized by a setup-time $t_S$ and a hold-time $t_H$ that should be respected in order to ensure stability. The setup-time $t_S$ defines a time period before a significant clock edge during which the input data of the synchronous device should not change. The hold-time $t_H$ defines a time period after a significant clock edge during which the input data should not change. A timing violation occurs if the setup-time or hold-time is not respected.

A static timing analysis of an integrated circuit design can identify one or more critical transmission paths, which are the transmission paths with the longest propagation delays between two synchronous devices in the circuit. The propagation delays on these critical transmission paths are generally used to determine the maximum permitted clock frequency of the circuit.

It is however necessary to allow a safety margin, as the propagation times of data in a given circuit may shift as a result of PVT (process, voltage, temperature) variations. The safety margin is based on the worst case scenario, and a problem is that such a design strategy therefore leads to performance that is far from optimal.

A publication by Y. Kanitake et al. entitled "Possibilities to Miss Predicting Timing Errors in Canary Flip-flops", IEEE, Jan. 7, 2011, proposes solutions for improving circuit performance by incorporating detection circuits in an integrated circuit that detect when timing violations occur, and controlling the level of the supply voltage accordingly.

A drawback of existing solutions such as the one described by Kanitake et al. is that, to be certain to avoid a timing violation anywhere in the circuit, it is necessary to add a detection circuit to each synchronous device of the circuit, leading to a reduction in circuit performance and a significant increase in cost and silicon area.

There is thus a need in the art for a new solution for improving circuit performance while reducing the number of detection circuits.

SUMMARY

It is an aim of embodiments of the present description to at least partially address one or more problems in the prior art.

According to one aspect, there is provided a method of circuit conception comprising: performing static timing analysis on a circuit design to identify a first subset of the synchronous devices having at least one input path with a slack time below a first threshold; simulating the circuit design using one or more functional test patterns to identify a second subset of the synchronous devices for which the number of activations during the simulation is above a second threshold; selecting at least one synchronous device forming part of both of the first and second subsets; and modifying the circuit design to include, for each selected synchronous device, a detection circuit coupled to one or more inputs of the selected synchronous device.

According to one embodiment, the detection circuit added to each selected synchronous device is coupled to at least one clock input and at least one data input of the selected synchronous device.

According to one embodiment, the simulation is performed on an RTL (register transfer level) representation of the circuit design.

According to one embodiment, the method further comprises, prior to said simulation, defining a layout of the circuit design by performing placement and routing, and determining by timing analysis at least the propagation delays of some or all paths between the synchronous devices, wherein said second subset of synchronous devices are those for which the number of activations during the simulation with a propagation delay of more than a third threshold is above the second threshold.

According to one embodiment, said selection comprises selecting a plurality of synchronous devices forming part of both of the first and second subsets based at least partially on the location of the synchronous devices across said layout.

According to one embodiment, the timing analysis is based on first performance models of the synchronous devices of the circuit design, the method further comprising: performing a further timing analysis of the circuit design to determine the propagation delays of said some or all paths between the synchronous devices based on second performance models of the synchronous devices, the second performance model assuming aging with respect to the first performance model; and comparing, for each of the paths, the propagation delay generated by the timing analysis and by the further timing analysis, wherein said second subset of synchronous devices are those for which the time difference between said propagation delays is above a fourth threshold.

According to one embodiment, simulating the circuit design comprises generating code defining a spy register adapted to observe, during the simulation, a clock input and at least one data input of each synchronous device of the first subset.

According to one embodiment, the method further comprises: determining a toggle rate associated with each synchronous device of the first subset, the toggle rate indicating the number of data transitions received by the synchronous device during the simulation with propagation delays over the third threshold; and wherein selecting at least one synchronous device forming part of both of the first and second subsets comprises selecting at least one synchronous device having a toggle rate over a fourth threshold.

According to one embodiment, each of the paths between synchronous devices of the circuit design comprises one or more cells, the method further comprising, prior to simulating the circuit design, generating a standard delay format (SDF) timing file indicating a cell delay for each of the cells.

According to one embodiment, each detection circuit is adapted to activate a warning signal if a data signal on the at least one data input of the selected synchronous device transitions during a detection time window, at least part of the detection time window covering a time period for which a setup-time of the selected synchronous device is not violated.

According to a further aspect, there is provided a data storage medium storing thereon instructions that, when executed by a processing device, cause the above method to be implemented.

According to a further aspect, there is provided a device for circuit conception comprising: a memory storing a circuit design comprising synchronous devices; and a processing device adapted to: perform static timing analysis on a circuit design to identify a first subset of the synchronous devices having at least one input path with a slack time below a first threshold; simulate the circuit design using one or more functional test patterns to identify a second subset of the synchronous devices for which the number of activations during the simulation is above a second threshold; select at least one synchronous device forming part of both of the first and second subsets; and modify the circuit design to include, for each selected synchronous device, a detection circuit coupled to one or more inputs of the selected synchronous device.

BRIEF DESCRIPTION OF THE DRAWINGS

The foregoing and other features and advantages will become apparent from the following detailed description of embodiments, given by way of illustration and not limitation with reference to the accompanying drawings, in which.

DETAILED DESCRIPTION

Throughout the following disclosure, the following terms will be given the following definitions:

synchronous device—any device that operates based on a clock signal, such as a register, e.g. a flip-flop or latch, or other type of device such as a RAM (random access memory), ROM (read only memory), etc.; and operating point—a combination of one or more supply voltages, one or more clock frequencies, a fabrication process and temperature;

optimal operating point—a functional operating point from which a very small frequency and/or voltage change will induce a timing violation. Generally, such an optimal operating point is theoretical and unreachable in practice;

target operating point—an operating point which for example corresponds to a supply voltage and clock frequency that are both within 5 percent of the optimal operating point. For a given circuit, the target operating point will vary, and is for example estimated as will be described in more detail below.

Figure 1A:
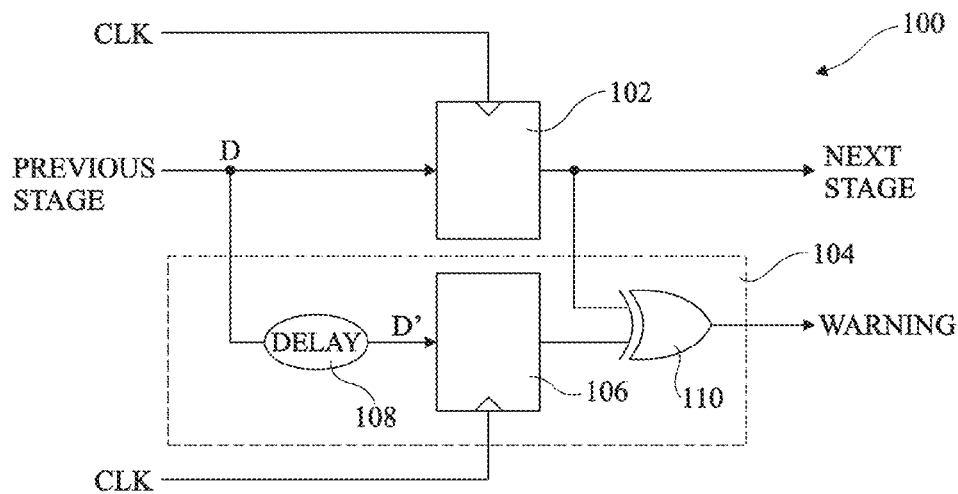
FIG. 1A schematically illustrates a "canary flip-flop" type detection circuit that has been proposed.

FIG. 1A schematically illustrates a circuit 100 comprising a synchronous device 102 equipped with a "canary flip-flop" type detection circuit 104 substantially as described in the publication by Y. Kanitake et al. referenced above in the background section.

The synchronous device 102, which is for example a D-type flip-flop, has a data input coupled to a data input line receiving a data signal D coming from a previous stage (PREVIOUS STAGE). The synchronous device 102 is clocked by a clock signal CLK received on a clock input line. A data output of the synchronous device 102 is coupled to a next stage (NEXT STAGE).

The detection circuit 104 for example comprises a further synchronous device 106 having a data input coupled to the data input line via a delay element (DELAY) 108, and thus receives a delayed version D' of the data signal D. The synchronous device 106 is for example clocked by the same clock signal CLK as the device 102. A data output of the synchronous device 106 is coupled to one input of a comparator 110, implemented for example by an XOR gate. The other input of the comparator 110 is coupled to the output of the synchronous device 102. The comparator 110 activates an warning signal (WARNING) at its output if the signals at the outputs of the synchronous devices 102, 106 are different from each other.

Operation of the circuit of FIG. 1A will now be described in more detail with reference to the timing diagram of FIG. 1B.

Figure 1B:
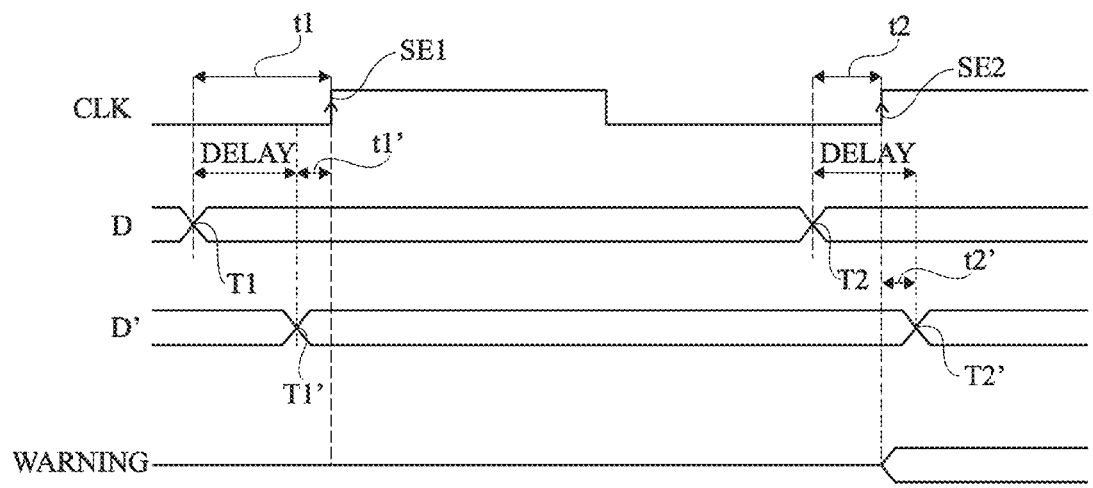
FIG. 1B is a timing diagram illustrating an example of signals in the circuit of FIG. 1A.

FIG. 1B illustrates examples of the clock signal CLK, data signals D and D', and the warning signal WARNING in the circuit of FIG. 1A.

As illustrated, the data signal D for example has a transition T1 occurring at a time t1 before a significant clock edge SE1 of the clock signal CLK, which in the example of FIG. 1B is a rising edge. The time t1 is higher than the setup-time $t_S$ of the synchronous device 102. The signal D' has a transition T1' delayed by the delay period (DELAY) with respect to the transition T1 of the signal D and thus arrives a time t1' before the significant clock edge SE1 of the clock signal CLK. The time t1' is higher than the setup-time $t_S$ of the synchronous device 106. Thus both of the synchronous devices 102 and 106 capture the data signals D and D' after the respective transitions T1, T1', and the warning signal remains low.

The data signal D also for example has a transition T2 occurring at a time t2 before a next significant clock edge SE2 of the clock signal CLK. The time t2 is higher than the setup-time $t_S$ of the synchronous device 102. The signal D' has a transition T2' delayed by the delay period (DELAY) with respect to the transition T2 of the signal D, but in this example the transition time t2' is negative (the transition occurs after the edge SE2) and is lower than the setup-time $t_S$ of the synchronous device 106. Thus the synchronous device 102 captures the data signal D just after the transition T2, and the synchronous device 106 captures the data signal D' before the transition T2', leading to a difference in the outputs of the synchronous devices 102, 106. Thus the warning signal is activated shortly after the significant clock edge SE2. The warning signal is for example at a low level when deactivated and is activated to a high level, or is at a high level when deactivated, and is activated to a low level.

The time delay introduced by the delay element 108 is for example equal to the setup-time $t_S$ of the synchronous device 102, such that the warning signal is activated whenever there is a setup-time violation. In some embodiments, the time delay is greater than the setup-time $t_S$ of the synchronous device 102, such that there is a margin between when the detection circuit 104 asserts the warning signal and when a timing violation actually occurs. Thus the detection circuit 104 can provide an early warning of a potential future timing violation if data transitions continue to get closer to the clock edge. Additionally or alternatively, in the case that the detection circuit 104 is coupled to a non-critical path, the margin may be selected such that the warning signal is asserted when a timing violation is likely to have occurred in a critical transmission path of the circuit.

Figure 2A:
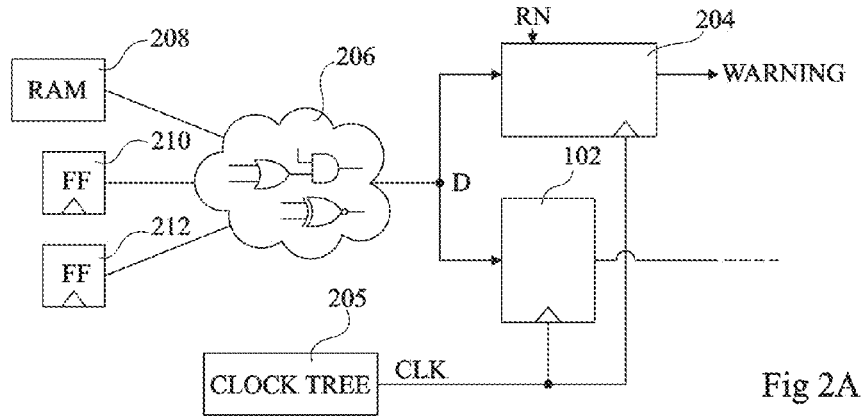
FIG. 2A schematically illustrates a detection circuit according to a further example embodiment of the present disclosure.

FIG. 2A schematically illustrates a circuit comprising the synchronous device 102 equipped with a different type of detection circuit 204 to the circuit 104 of FIG. 1A. The detection circuit 204 provides a warning of a potential timing violation. As with the circuit 104, the detection circuit 204 receives the same clock signal CLK, generated for example by a clock tree (CLOCK TREE) 205, and the same data signal D as the synchronous device 102 to be monitored. The detection circuit 204 also for example receives a reset signal RN. In FIG. 2A, propagation paths to the register 102 are represented by a cloud 206 comprising combinational logic gates. Any of a broad range of synchronous devices may supply the combinational logic, and in the example of FIG. 2A there are three transmission paths leading to the synchronous device 102, one coming from a random access memory (RAM) 208 and the other two coming from flip-flops (FF) 210, 212.

Figure 2B:
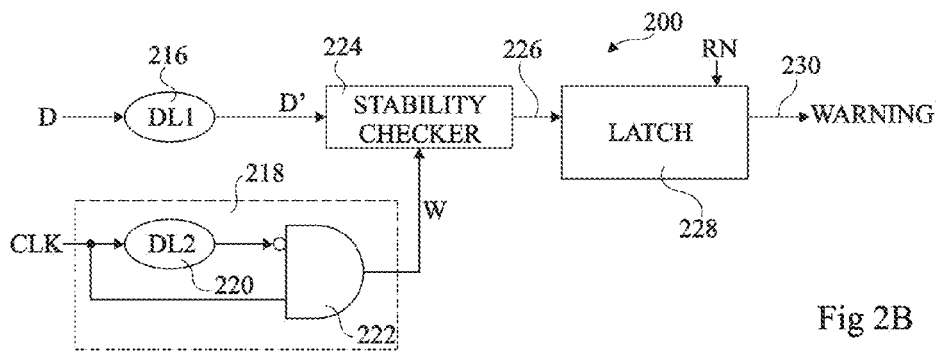
FIG. 2B schematically illustrates the detection circuit of FIG. 2A in more detail according to an example embodiment.

FIG. 2B schematically illustrates the detection circuit of FIG. 2A in more detail according to an example embodiment.

The input line receiving the data signal D is for example coupled to a delay element (DL1) 216, which generates a delayed version D' of the data signal D. The clock input line is for example coupled to a pulse generator 218, which generates a signal W comprising a pulse of a certain duration on each significant edge of the clock signal. For example, the pulse generator 218 comprises a delay element (DL2) 220 coupled to the clock input line, and having its output coupled via an inverter to one input of an AND gate 222. The other input of AND gate 222 is for example coupled to the clock input line.

The output of the delay element 216 and the output of the pulse generator 218 are coupled to a stability checker (STABILITY CHECKER) 224, which is adapted to activate a signal on an output line 226 if a transition of the data signal D' occurs during a pulse of the signal W. The output line 226 is for example coupled to a latch (LATCH) 228, which stores an activated state of the signal on the line 226 until the reset signal RN is asserted, and asserts a warning signal (WARNING) on an output line 230 of the latch. The warning signal is for example at a low level when deactivated and is activated to a high level, or is at a high level when deactivated, and is activated to a low level. For example, the latch 228 has its data input coupled to a high state, and is clocked by the line 226 such that this high state is stored and outputted by the latch when the signal on line 226 is activated.

Figure 2C:
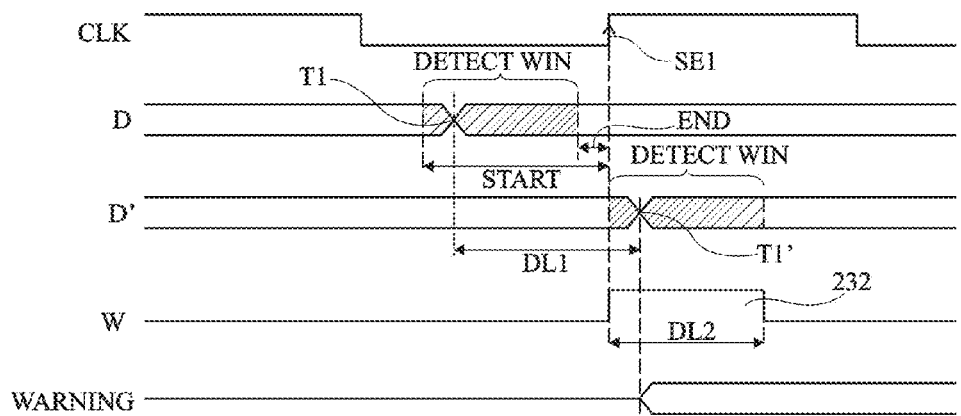
FIG. 2C is a timing diagram illustrating signals in the circuit of FIG. 2B according to an example embodiment.

FIG. 2C is a timing diagram illustrating the clock signal CLK, the data signals D and D', the signal W and the warning signal WARNING in the circuit of FIG. 2B according to an example embodiment.

As illustrated, the signal W has a high pulse 232 starting shortly after a significant edge SE1 of the clock signal CLK and having a duration DL2 equal to the delay introduced by the delay element 220 of the pulse generator 218. The high pulse 232 corresponds to a detection window (DETECT WIN) applied to the data signal D'. The data signal D' is delayed with respect to the data signal D by a time period DL1 introduced by delay element 216, and thus the detection window applied to the signal D' is equivalent to applying a detection window to the data signal D starting at a time period START before the rising edge SE1, and ending at a time period END before the rising edge SE1, where START is equal to the time delay DL1, and END is equal to the difference DL2-DL1 between the time delays DL1 and DL2, which is for example negative if falling before the clock edge.

In the example of FIG. 2C, the data signal D has a transition T1 occurring during the detection window, and thus the warning signal WARNING is asserted shortly after the corresponding transition T1' of the data signal D'.

Figure 2D:
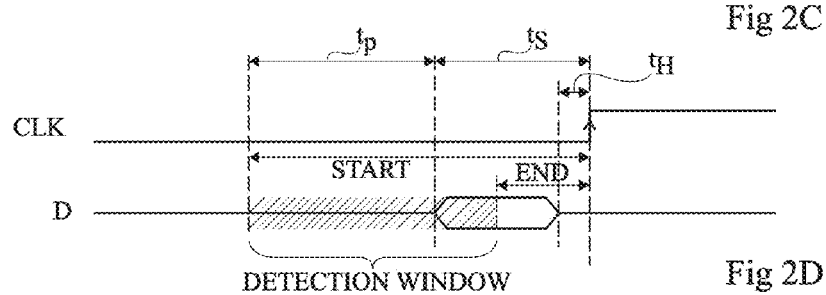
FIG. 2D is a timing diagram illustrating an example of a detection window according to an example embodiment of the present disclosure.

FIG. 2D is a timing diagram illustrating an example of a detection window (DETECTION WINDOW) according to an example embodiment.

The time START of the detection window, corresponding to the duration between the start of the detection window and the significant clock edge, is for example equal to the setup-time $t_S$ of the synchronous device plus a further duration $t_P$ referred to herein as a pessimism time. During this period $t_P$, a data transition does not cause a timing violation in the synchronous device, but triggers the warning signal, for example as a warning of a potential timing violation occurring on a more critical path in the circuit. The operating point at which the warning signal is triggered for example corresponds to a point close to the optimal operating point of the circuit.

The end time of the detection window is for example lower than the hold-time of synchronous device. Otherwise, if a data signal arrives early on one of the paths, it could be mistaken as a hold-time or setup-time violation. It will be noted that in the example of FIG. 2D, the hold-time has a negative value, meaning that it defines a time limit occurring before the significant clock edge. The end time is also negative, and because the end time is lower than the hold-time, the end of the detection window occurs before the time limit defined by the hold-time.

The detection window for example has a duration longer than the minimum change in the respective timings of the clock signal and the data signal when a minimum change is applied to the clock frequency or to the supply voltage of the circuit. For example, if the supply voltage of the circuit is constant and the frequency is varied, the detection window is for example chosen to be longer than the minimum change in the clock period resulting from an increment in the frequency. Alternatively, if the clock frequency is constant and the supply voltage is varied, the detection window is for example chosen to be longer than the delay increase in the data signal resulting from a decrement of the supply voltage. By choosing the length of the detection window in this way, the case is avoided in which a change applied to the clock frequency or to supply voltage causes a big enough change in the signal time to cause transitions to move in one step from one side of the detection window to the other side, meaning that no warning signal is triggered.

In some embodiments, the detection window is variable based on the level of the supply voltage, as will now be described with reference to FIGS. 2E to 2H.

Figure 2E:
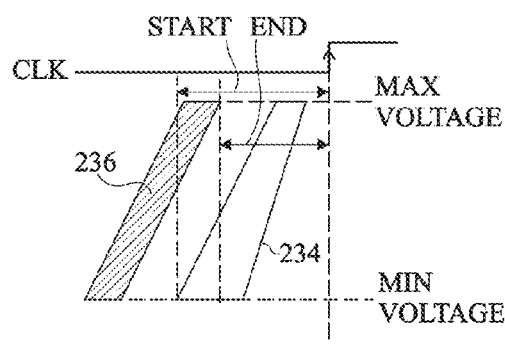
FIGS. 2E to 2H illustrate examples of detection window ranges according to an example embodiment.

As represented in FIG. 2E, a quadrilateral 234 represents the possible variations in the setup-times and hold-times of a synchronous device for a supply voltage ranging from a minimum value (MIN VOLTAGE) to a maximum value (MAX VOLTAGE). A shaded quadrilateral 236 represents the detection window, which varies as a function of the supply voltage. For example, the delay elements DL1 and DL2 of FIG. 2B introduce delay times that shift as a result of changes to the operating point. FIG. 2E illustrates an example according to which the size of the detection window is at or close to a minimum. Both the start time and the end time occur just earlier than the setup-time of the synchronous device over the voltage range.

Figure 2F:
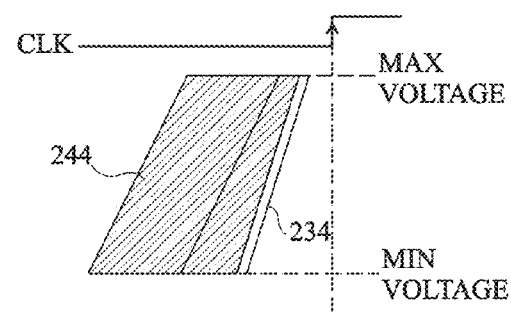

FIG. 2F illustrates the same quadrilateral 234 as FIG. 2E representing the setup-time and hold-time of the synchronous device, and a shaded quadrilateral 244 represents the detection window for the voltage range MIN VOLTAGE to MAX VOLTAGE having a size at or close to a maximum. As illustrated, the start time of the detection window 244 in FIG. 2F is for example the same as for FIG. 2E, but the end time occurs just earlier than the time limit defined by the hold-time over the voltage range. The start time remains for example at a fixed offset with respect to the setup-time over the voltage range of the synchronous device.

Figure 2G:
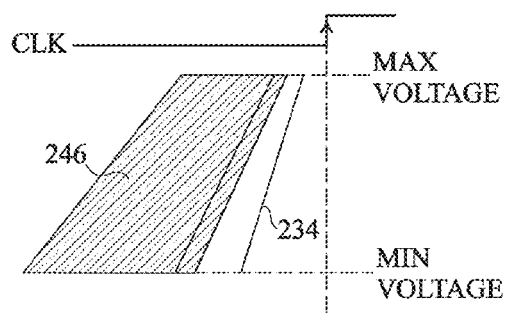

FIG. 2G illustrates a further example of a detection window 246 for the same setup time and hold-time 234 as for FIGS. 2E and 2F. According to this example, the detection window is wider at lower voltages than at higher voltages. In other words, at lower supply voltages, the start time of the detection window has a higher offset with respect to the setup-time than at higher supply voltages. This is advantageous because there is higher variability at lower voltages, and thus a path that is not critical at an intermediate supply voltage may become critical at a high supply voltage. The end time is for example earlier than the time limit defined by the hold-time, and preferably the window length is at a minimum.

Figure 2H:
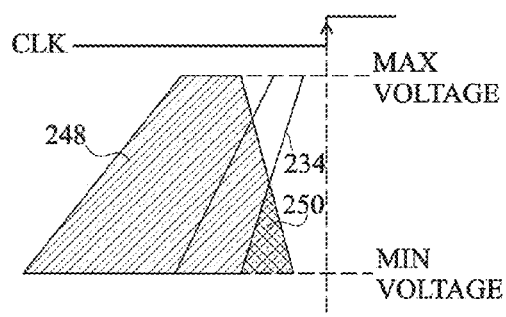

FIG. 2H illustrates yet a further example of a detection window 248 according to a non-advisable embodiment in which the end time of the detection window occurs later than the time limit defined by the hold-time in a criss-crossed region 250 for a relatively low voltage range. In such a case, the detection circuit will add additional constraints to the circuit. For example, in such a case, short circuit paths having more critical hold-times should be elongated by the addition of buffers on these paths. Thus the end time of the detection window is for example chosen not to be worse than the hold-time of a regular register.

Figure 3A:
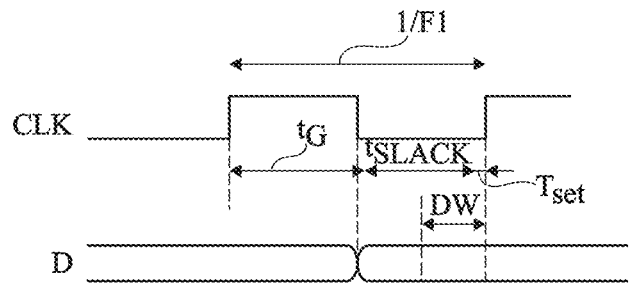
FIGS. 3A to 3C are timing diagrams illustrating an example of use of the detection circuit of FIG. 1A or 2A.
Figure 3B:
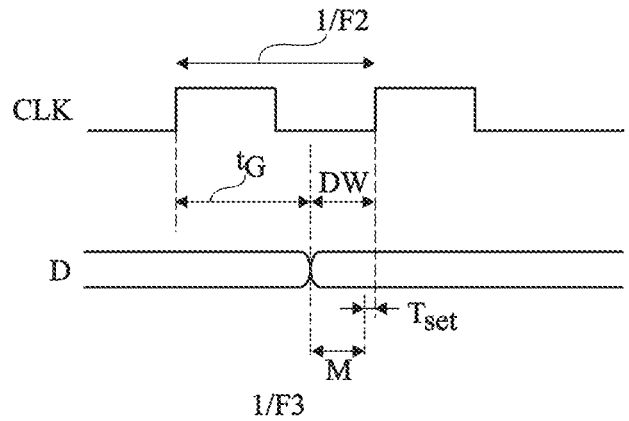
Figure 3C:
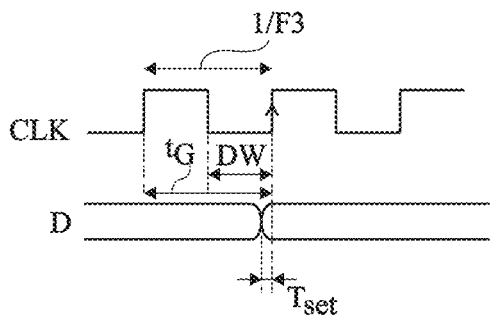

FIGS. 3A to 3C are timing diagrams illustrating an example of use of the detection circuit 104 or 204. In the examples illustrated in these figures, the detection window has an end time on the rising edge of the clock signal CLK, but this is merely one example.

FIG. 3A illustrates the clock signal CLK having a frequency F1 and the data signal D at the input of the synchronous device being monitored. The propagation time $t_G$ of the data signal D at the input of the synchronous device starts from a preceding rising edge of the clock signal and ends in this example before the detection window, labelled DW in FIGS. 3A to 3C. As the data signal does not transition during the detection window DW, the detection circuit does not generate any warning signal.

Assuming that the propagation time $t_G$ corresponds to the longest path to the register, a slack time of the synchronous device, labelled $t_{SLACK}$ in FIG. 3A, is for example defined as the clock period $t_{CLK} - t_G - T_{set}$, where $t_{CLK}$ is the clock period equal to 1/F1 in FIG. 3A and $T_{set}$ is the setup-time of the synchronous device. The significance of the slack time will be described in more detail block.

FIG. 3B illustrates an example in which the clock signal CLK has a frequency F2, which is higher than F1. The data signal D transitions at the start of the detection window DW, and in this case the detection circuit detects this transition, and generates a warning signal. However, for the synchronous device being monitored, there has been no timing violation, because the transition does not occur during the setup-time $t_S$ of the synchronous device. FIG. 3B therefore illustrates a non-optimal operating point if only the operation of the monitored synchronous device is considered, because there is still a time margin M between the data transition and the setup-time of the synchronous device, which could be reduced. If however the detection circuit is not associated with the most critical data path in the circuit, it is desirable to maintain a margin M that is at least equal to the difference in propagation time between the most critical data path and the path associated with the synchronous device being monitored. The detection circuit can thus indicate when there is a risk of a timing violation on the most critical data path.

FIG. 3C illustrates an example in which the clock signal CLK has a frequency F3 higher than F1 and F2 and which results in the data signal transitioning at the time limit defined by the setup-time $t_S$ of the synchronous device. In other words, the margin M of FIG. 3B is no longer present, and if the frequency of the clock signal increases any more, a timing violation of the setup-time will occur for the synchronous device being monitored by the detection circuit. FIG. 3C thus illustrates an optimal operating point for the synchronous device, and the frequency F3 corresponds to the maximum frequency that can be tolerated by the synchronous device in view of its associated input data path or paths.

It can be seen from FIGS. 3A to 3C that a detection window can be used that results in a warning signal at a clock frequency F2 lower than the maximum frequency F3 of the synchronous device.

Thus an advantage of the detection circuits described in relation to FIGS. 1A and 2A is that, by providing a warning signal before a timing violation occurs at their synchronous device, a timing violation occurring in a more critical path can be detected without equipping the more critical path with a detection circuit. This is advantageous as the detection circuits will add a certain amount of capacitance to the input signals of the synchronous devices, thereby reducing performance, which is preferably avoided in the case of the most critical paths of the circuit. A further advantage is that it is not necessary to identify the most critical path or paths of the circuit, which can be difficult as it depends on the current operating point and on the computation performed by the circuit.

Figure 4:
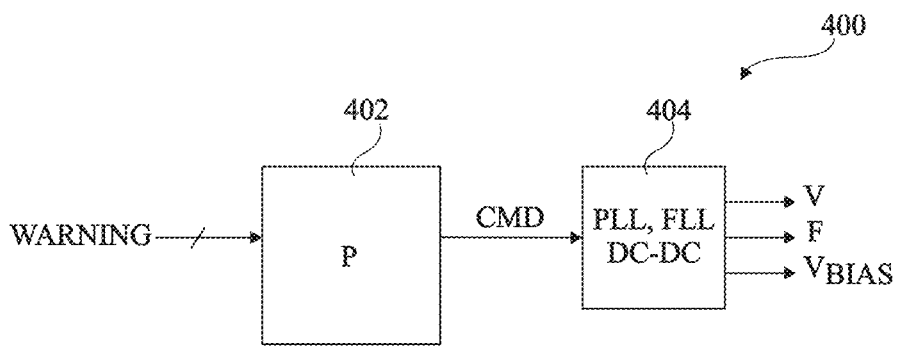
FIG. 4 schematically illustrates an integrated circuit operating point control system according to an example embodiment.

FIG. 4 schematically illustrates an integrated circuit control system 400 according to an example embodiment. As illustrated, a processing device 402, which is for example implemented in hardware or software, is for example coupled to the output of one or more detection circuits (not illustrated in FIG. 4) that monitor synchronous devices in the circuit, such that the processing device 402 receives the warning signals (WARNING) from the detection circuits. In response to the activation of one or more of the warning signals, the processing device for example generates a control signal CMD, which is provided to a control circuit 404, which for example comprises a phase and/or frequency locked loop (PLL, FLL) for controlling the frequency F of the clock signal, and/or a DC to DC voltage converter (DC-DC) for generating the supply voltage V of the circuit. Additionally or alternatively, the DC-DC voltage converter may control a bias voltage $V_{BIAS}$ of the integrated circuit.

In operation, according to one embodiment, to bring the integrated circuit to a target operating point and thus improve performance of the integrated circuit, an exploration phase is for example performed. This for example involves either reducing the supply voltage V of the circuit in decrements, or increasing the clock frequency F of the circuit in increments, until one or more of the warning signals from the detection circuits is activated. For each operating point, a functional test pattern is applied to the circuit so that one or more warning signals is activated if the target operating point is reached or passed. The final values of the supply voltage V and frequency F are then for example maintained, or returned to their values just prior to the activation of the warning signal(s).

As an alternative to the integrated circuit control system of FIG. 4 described above, the detection circuit 104 or 204 described herein could be used in the calibration method and circuit described in the French patent application filed on 7 Feb. 2014 and published as FR3017466, and in the PCT patent application filed in the name of the present applicant and published as WO2015/118145, the contents of which is hereby incorporated by reference to the extent permitted by the law. According to such a method, a first operating point of the circuit, spaced from the target operating point, is detected, for example during an exploration phase involving applying a function test pattern in a similar manner as describe above with reference to FIG. 4. The operating point of the circuit is then shifted to the target operating point, for example by increasing the clock frequency and/or lowering the supply voltage. In some embodiments, a calibration phase is used to define, for a given circuit and in some cases for a given temperature, the change in the clock frequency and/or supply voltage for bringing the circuit from the first operating point to the target operating point.

Irrespective of the particular method that is used to bring the operating point of the integrated circuit to the target operating point using the detection circuits, the synchronous devices in the circuit to be equipped with detection circuits should be selected. As indicated above, the detection circuits 104 and 204 may advantageously be used to equip non-critical paths. However, in general, there will only be one or a few critical paths in the circuit that limits the performance of the circuit, but identifying such critical paths is generally impossible. Furthermore, equipping all non-critical paths would be extremely costly. It will also be noted that the detection circuits 104 and 204 each use delays in order to introduce a margin/pessimism period. For non-critical paths with relatively short propagation times, these delays would need to be large, leading to relatively high surface area, high delay mismatch and power consumption of the detection circuits.

Figure 5:
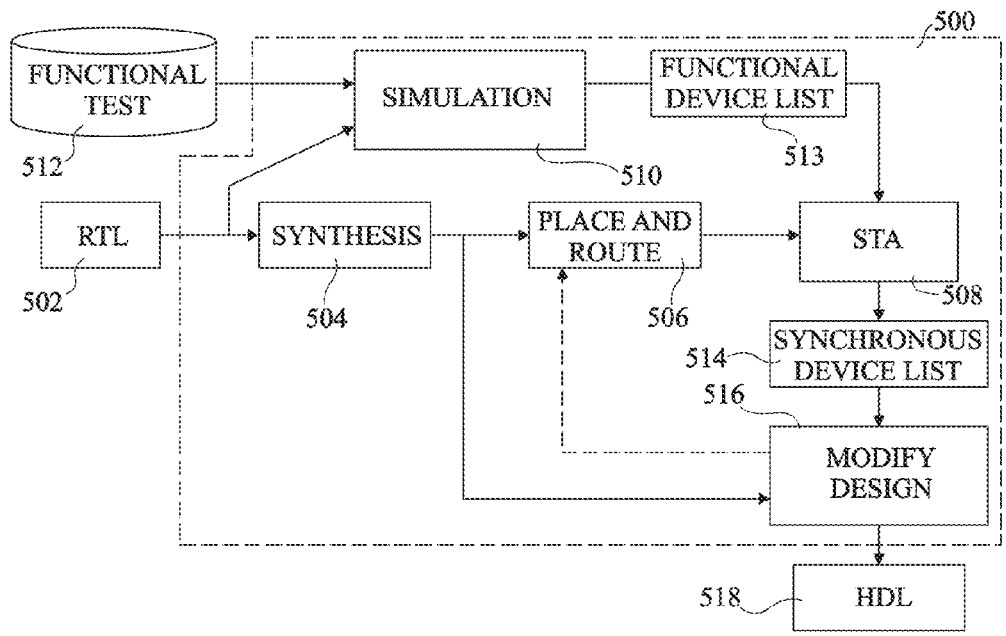
FIG. 5 represents a method of circuit conception according to an example embodiment of the present disclosure.

FIG. 5 represents a method 500 of circuit conception according to an example embodiment. In particular, FIG. 5 represents a method for selecting and equipping, in a circuit design, a plurality of synchronous devices with detection circuits.

The method for example starts with a file 502 describing the circuit design, which is for example an RTL (Register Transfer Level) description, or a description in another high level language.

The circuit design is for example synthesized, as represented by a block 504. This for example involves translating the RTL representation into a gate-level design, for example represented by a hardware description language, such as Verilog or VHDL (Very high speed integrated circuit Hardware Description Language). Of course, in some embodiments this synthesis step could be omitted if the file 502 already represents the circuit design at the gate level.

A physical design of the circuit is then for example generated as represented by a block 506. This operation could also be referred to as a "backend trial", and for example involves a place and route process for defining the layout of the circuit design at transistor level. Thus the lengths of the transmission paths in the circuit design are defined.

As represented by a block 508, static timing analysis (STA) is then for example performed on the circuit design. As known to those skilled in the art, static timing analysis provides a fast and relatively accurate measurement of circuit timing, and is for example used to define the slack time of each synchronous device.

The RTL file 502 is also for example simulated, as represented by a block 510 in FIG. 5. The simulation is for example based on a functional test pattern 512, which is applied to the inputs of the circuit. The simulation can for example be used to generate a functional devices list 513 of the synchronous devices of the circuit that are functional during the simulation, in other words that become active one or more times during the simulation. This list is for example provided to the static timing analysis block 508. A synchronous device is for example considered to be active if it receives a data transition at one or more data inputs. Of course, such a list of functional synchronous devices only reflects the devices that are activated by the given functional test pattern. The functional test pattern is for example chosen as one which is capable of being executed on the final device with the functional mode of the circuit. For example, if the final device is a mobile telephone processor, the functional test pattern could correspond to a video decoding operation. The functional test pattern should for example be relatively complex in order to excite critical paths of the circuit, but not necessarily the most critical path. For example, in a processor, the functional test pattern is for example chosen such that it excites the arithmetic units, which generally correspond to relatively critical paths in the circuit.

The list of functional synchronous devices identified during the simulation is for example further reduced by the static timing analysis to exclude non-critical timing paths. For example, as will be described in more detail below, only functional synchronous devices having a slack time of less than a certain value are for example selected. As represented in FIG. 3A discussed above, the slack time $t_{SLACK}$ of a synchronous device is for example defined as $t_{CLK}$−max $(T_{G1}, T_{G2} \ldots T_{GP})-T_{set}$, where $t_{CLK}$ is the clock period, $T_{G1}$ to $T_{GP}$ are the propagation times of the P transmission paths leading to the synchronous device, and $T_{set}$ is the setup-time of the synchronous device. For some synchronous devices, P may be equal to only 1.

An advantage of not equipping synchronous devices that are non-functional during simulation is that such devices are also likely to be non-functional during the exploration phase applied by the integrated circuit after fabrication, particularly if the same or a similar functional test is applied. Thus it will be rare that a detection circuit coupled to such synchronous devices will provide a useful indication of the target operating point of the circuit. Furthermore, by also relying on the static timing analysis, only synchronous devices having relatively low slack time can be equipped. As mentioned above, this is advantageous as when the slack time is high, the time delays to be implemented within the detection circuits will also be high, leading to high area and energy consumption.

The static timing analysis and simulation thus results in a list 514 of synchronous devices that are both functional during the functional tests and for which the slack time is less than a threshold.

As represented by a block 516, the circuit design is then for example modified to add detection circuits, such as the device 104 of FIG. 1A or the device 204 of FIG. 2A, to some or all of the synchronous devices on the list. This modification is for example applied to the circuit design after the synthesis step 504, and thus results in a modified HDL (Hardware description language) representation 518, which is for example in Verilog or VHDL. As represented by a dashed arrow, in some embodiments the HDL representation is then processed again by the blocks 506 and 508 to generate a new list 514 of synchronous devices, which may be modified in view of the addition of the detection circuits to the circuit design. The physical implementation of the circuit is for example generated in the step 516 or after the step 518, which has the advantage of allowing the synchronous device list 514 to be used during this implementation.

Figure 6:
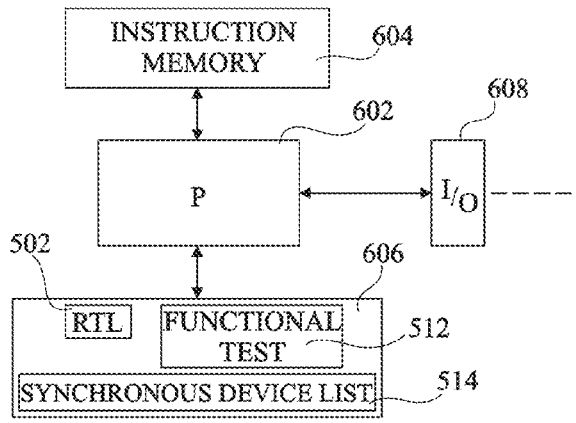
FIG. 6 schematically illustrates hardware for implementing the method of FIG. 5.

FIG. 6 schematically illustrates an example of hardware for implementing the method 500 of FIG. 5. As illustrated, the hardware for example comprises a processing device (P) 602, comprising one or more processors under control of instructions stored in an instruction memory (INSTRUCTION MEMORY) 604, which cause the method to be implemented. The processing device 602 is coupled to a further memory 606, which may be part of a same or different memory device to the instruction memory 604. The memory 606 for example stores the RTL file (RTL) 502 and the functional test (FUNCTIONAL TEST) 512 forming inputs to the method 500, and also the synchronous device list (SYNCHRONOUS DEVICE LIST) 514 generated by the step 508.

Figure 7:
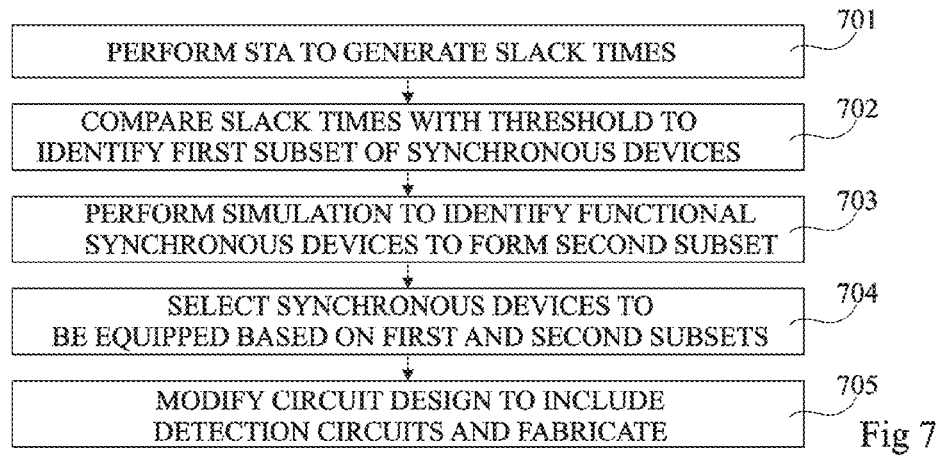
FIG. 7 is a flow diagram illustrating steps in a method of selecting registers to be equipped with detection circuits according to an example embodiment.

FIG. 7 is a flow diagram illustrating operations in a method of selecting registers to be equipped with detection circuits based on the method of FIG. 5.

In an operation 701, static timing analysis is performed on the circuit design to generate slack time measurements for some or all of the transmission paths to some or all of the synchronous devices in the circuit design.

In an operation 702, the slack times are compared with a threshold in order to identify a first subset of the synchronous devices.

In an operation 703, simulation is performed on the circuit design by applying a function test pattern to identify synchronous devices that are functional during simulation, the identified devices forming a second subset.

In an operation 704, the synchronous devices to be equipped are selected based on the first and second identified subsets. In one embodiments, all common synchronous devices between the first and second subsets are included on a list of devices to be equipped. In alternative embodiments, only a certain number of the registers coupled to the most critical paths is selected.

In an operation 705, the circuit design is for example modified to incorporate detection circuits for monitoring the selected synchronous devices, and one or more circuits are for example fabricated based on the modified circuit design.

Figure 8:
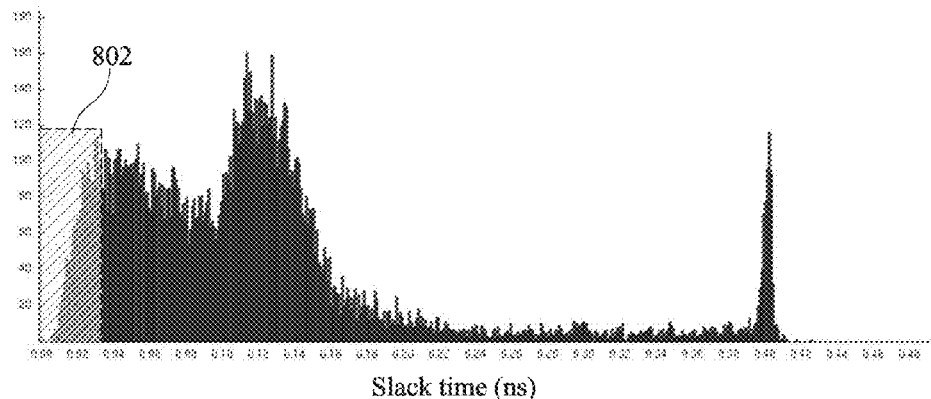
FIG. 8 is a graph illustrating an example of results of a static timing analysis according to an example embodiment.

FIG. 8 is a distribution graph illustrating an example of results of a static timing analysis according to an example embodiment. In particular, the graph illustrates, along the x-axis, the measured slack time of each transmission path, and along the y-axis, the number of devices that has the specified slack time. For example, there are 120 registers or other devices having a slack time of 0.03 ns. As represented by a dashed rectangle 802, the synchronous devices forming the selected subset for example correspond to those having a data input coupled to one of the transmissions paths having the lowest slack time.

The method of FIG. 5 based on a static timing analysis and on a simulation is able to select synchronous devices that are functional for a given functional test pattern, and that have a transmission path leading to them that is relatively critical, in other words having a low slack time. However, it is possible that some of the synchronous devices meeting these criteria also have one or more short transmission paths leading to them, and that it is the one or more short transmission paths that are activated during the simulation. In such a case, equipping such synchronous devices is not useful. A method that generates an even more restrictive list of synchronous elements to be equipped will now be described with reference to FIGS. 9 to 12. This method may also be implemented by the hardware illustrated in FIG. 6.

Figure 9A:
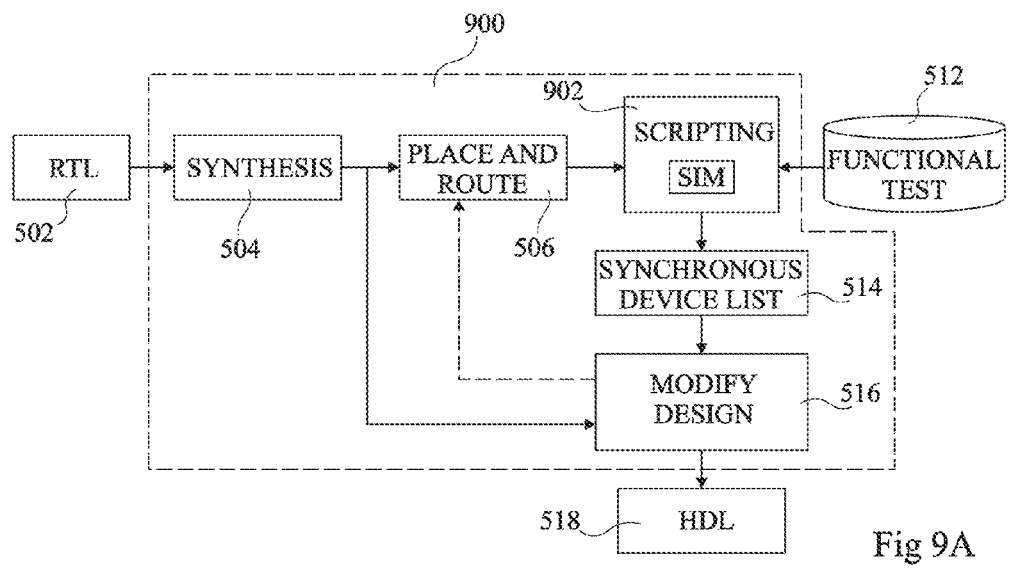
FIG. 9A represents a method of circuit conception according to a further example embodiment.

FIG. 9A represents a method of circuit conception according to a further example embodiment. Many steps of the method are the same as steps of FIG. 5, and these have been labelled with like references and will not be described again in detail.

With respect to the method 500 of FIG. 5, in the method 900 of FIG. 9A the simulation step 510 and the STA step 508 have been replaced by a scripting step 902 performed after the place and route operation 506, and which involves a simulation based on the functional test 512. However, whereas in the embodiment of FIG. 5 the simulation is based on the RTL circuit representation, the simulation performed in step 902 is for example performed based on the gate-level representation of the circuit design and simulated with all of the parasitic values, such as resistances, capacitances and inductances. The gate-level representation is for example a Verilog or VHDL representation coupled with an SDF (Simulation Delay File). As with the method of FIG. 5, the step 902 provides a synchronous device list 514 of synchronous devices to be equipped with detection circuits in the step 516.

Figure 9B:
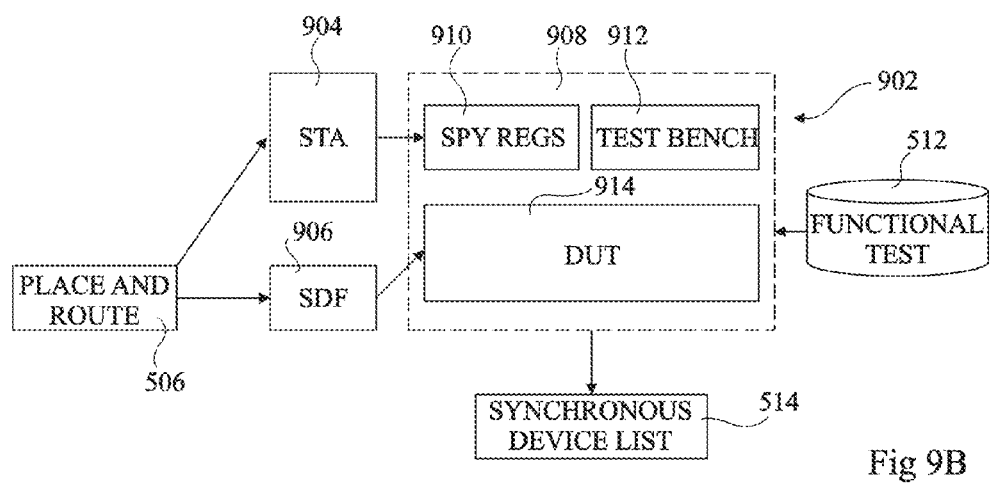
FIG. 9B illustrates a simulation operation of FIG. 9A in more detail according to an example embodiment.

FIG. 9B represents the scripting and simulation step 902 of FIG. 9A in more detail according to an example embodiment.

The circuit design resulting from the place and route operation 506 is for example provided for static timing analysis as represented by a block 904, and to a block 906, which generates a standard delay format (SDF) timing file. This SDF file for example indicates at least the propagation delay of each cell of the circuit design.

As represented by a dashed block 908, the results of the STA step 904, and the SDF file, are for example used in a method to generate the list 514 of synchronous devices to be equipped. In particular, the STA results are for example used in a step 910 to identify synchronous devices in the circuit design which are to be observed during the simulation. For example, a subset of the synchronous device of the circuit design are identified as those having a slack time below a given threshold.

In a step 910 a spy register file is generated comprising code for each synchronous device identified based on the STA results. During simulation, within a test environment defined by a test bench 912, of a device under test (DUT) 914, the spy register permits the input ports of each synchronous device to be observed.

For example, the code in the spy register file for each synchronous device is substantially as follows:

```
Spy_regs
spy spy_reg_A_D := DUT/reg_A/D
spy spy_reg_A_CP := DUT/reg_A/CP
Process (spy_reg_A_D, spy_reg_A_CP) {
....
}
``` where the synchronous device in this example is a register reg_A, and DUT/reg_A/D is the data input signal of the register, and DUT/reg_A/CP is the clock input signal of the register.

The spy register file enables spy signals to be extracted that observe or spy on the data and clock nodes of the synchronous devices. This allows spying on the DUT without modifying the design of the DUT or of the test bench.

The DUT 914 is then simulated by applying the functional test patterns 512 to its inputs. The SDF file 906 is used during the simulation to define the propagation delays of each cell of the circuit design, and thus using the spy registers, it is possible to determine the slack time for each synchronous device. For example, for each synchronous device, the slack time is computed on each significant clock edge, and the minimum slack time is computed based on the longest path to the synchronous device. To do this, a minimum slack time value for each synchronous device is updated on each detected event if the new value is lower than the previously stored minimum slack time. It is assumed that the circuit design being simulated has no timing issues, such as hold-time violations, as otherwise the simulation may not complete successfully. During simulation, the clock frequency is for example set at a lower value than the maximum clock frequency Fmax of the circuit to avoid setup time issues. It will be noted that setting a clock frequency lower than Fmax is not an issue because the methodology uses the actual clock period and the slack time of the synchronous devices to compute the longest propagation delay to each synchronous device.

Figure 10:
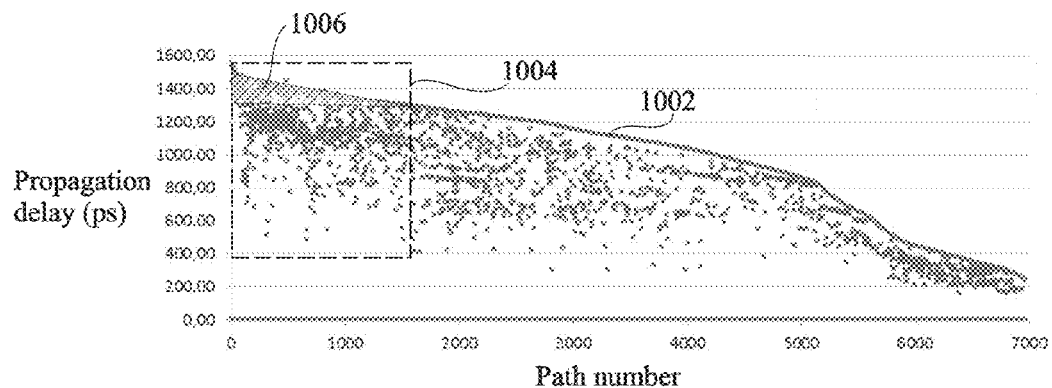
FIG. 10 is a graph representing minimum clock periods according to an example embodiment of the present disclosure.

FIG. 10 is a graph representing minimum clock periods calculated based on the simulation performed in operation 908 described above. The x-axis of the graph corresponds to the end-point number, and in the example of FIG. 10 there are for example 7000 end points, in other words 7000 synchronous devices. The end-points are ranked based on their level of criticality determined based on the STA data, with the lowest end-point numbers (equal or close to 0) being the most critical, and the highest end-point numbers (equal or close to 7000) being the least critical. The y-axis represents the longest propagation delay to each end-point in picoseconds. The square dots indicate a simulated longest propagation delay to each end-point for each synchronous device, calculated as the clock period applied to the DUT less the minimum value of the slack time of the synchronous device measured during the simulation. Thus if a synchronous device has a longest propagation delay of 1200 ps, this means that the clock period should be equal to or higher than 1200 ps in order to avoid a setup-time violation. There is one square dot on the graph per synchronous device, as even if the synchronous device is activated more than once during the simulation, only the longest propagation delay/lowest slack time is recorded.

A curve 1002 represents the minimum clock period for each end-point, calculated based on the STA data. The curve 1002 is monotonically decreasing, as the synchronous devices have been ranked based on the STA data.

It will be noted that while some of the square dots are on or close to the curve 1002, many are spread between the curve 1002 and the x-axis. This is because, while the STA data may indicate that a register is critical due to the fact that it is positioned at the end point of a critical transmission path, during the simulation, the synchronous device may be activated by another, non-critical timing path, rather than by the critical one.

A dashed rectangle 1004 in FIG. 10 represents all the synchronous devices that are functional during simulation and that are coupled to a path having an STA slack time below a threshold of, for example, 200 ps. These registers for example form the list 514 generated by the step 508 of FIG. 5. However, using the information regarding the criticality of the paths actually active during the simulation, only the synchronous devices corresponding to the square dots falling within a shaded triangle 1006 are for example selected to be equipped with detection circuits. These registers for example form the list 514 generated by step 908 of FIG. 9B. These are the synchronous devices that are not only determined as being critical according to the STA data, but which have a critical path activated during the simulation. In the example of FIG. 10, the most critical activated path has a longest propagation delay of 1500 ps, which defines the maximum frequency Fmax and thus the operating point of the circuit. The synchronous devices within the triangle 1006 are for example associated with a propagation delay of between 1450 and 1300 ps. Thus these synchronous devices have slack times of between 50 and 200 ps. The synchronous devices associated with the most critical paths in the circuit are not for example equipped to avoid adding further propagation delays to these paths, which could reduce the Fmax of the circuit.

In some embodiments, the spy register file 910 is adapted to count the number of events, in other words the number of times, during the simulation, that a synchronous device is activated with a propagation delay over a certain threshold. This information indicates how often each synchronous device executes a critical event. In some embodiments, the registers selected to be equipped are only those for which the number of critical events detected is more than a certain level. Indeed, the higher the rate of events for a given synchronous device when a functional test pattern is applied, the more likely it is that the synchronous device will also be activated by a functional test pattern applied to the device on silicon. Indeed, in some cases, the functional test pattern applied on silicon during an exploration phase will not be the same as the one applied to the DUT during simulation.

Furthermore, if multiple events are detected for a given synchronous device, it is likely that these events originate from different paths within the circuit. If a functional test pattern excites all of these paths, the warning signal at the output of the detection circuit will be triggered by the path with the longest propagation delay. Thus a single detection circuit will be able to monitor multiple critical paths.

In some embodiments, the spy register file 910 may observe a different error message for each critical path, if a functional pattern could be determined for each of the excited critical paths. For example, a different functional pattern is provided to excite each path arriving at a same synchronous device. For example, a pattern simu1 is used to excite one path, and a pattern simu2 is used to excite another path. Thus the same synchronous device is able to observe a plurality of paths arriving at it using different functional patterns.

Figure 11:
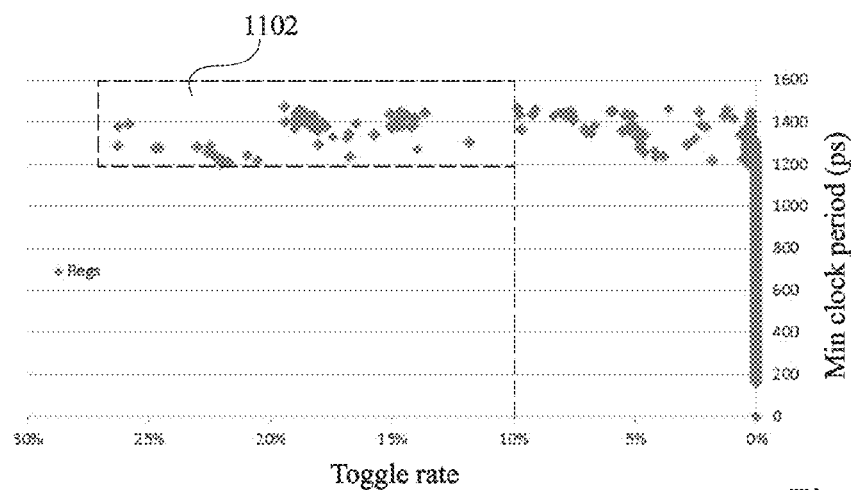
FIG. 11 is a graph illustrating an example of toggle rates according to an example embodiment of the present disclosure.

FIG. 11 is a graph illustrating an example of toggle rates for synchronous devices according to an example embodiment. In this example, the minimum propagation delay for an event to be considered is 1200 ps. Of course, in alternative embodiments a different threshold could be used. The toggle rate in FIG. 11 indicates the percentage of significant clock edges for which a synchronous device is activated by an event, when its propagation delay is over 1200 ps. An event corresponds for example to the reception of a data transition. Therefore, a register having a high overall toggle rate but only for paths of low propagation delays less than 1200 ps appear in FIG. 11 as having a toggle rate of 0 percent.

In the example of FIG. 11, as represented by a dashed rectangle 1102 the selected synchronous devices for example correspond to those having a toggle rate of at least 10 percent, although in alternative embodiments a different threshold could be applied.

It should be appreciated that the detection circuits integrated into the final manufactured device will be used to determine the target operating frequency of the circuit. In some cases, the target operating frequency is determined by applying a functional test pattern to the circuit and using an exploration at each clock frequency to estimate the target operating frequency for a range of supply voltages. Therefore, in some embodiments, the distribution of events detected by the synchronous devices during a given functional test pattern is used to identify good candidates to be equipped as will now be described in more with reference to FIG. 12.

Figure 12:
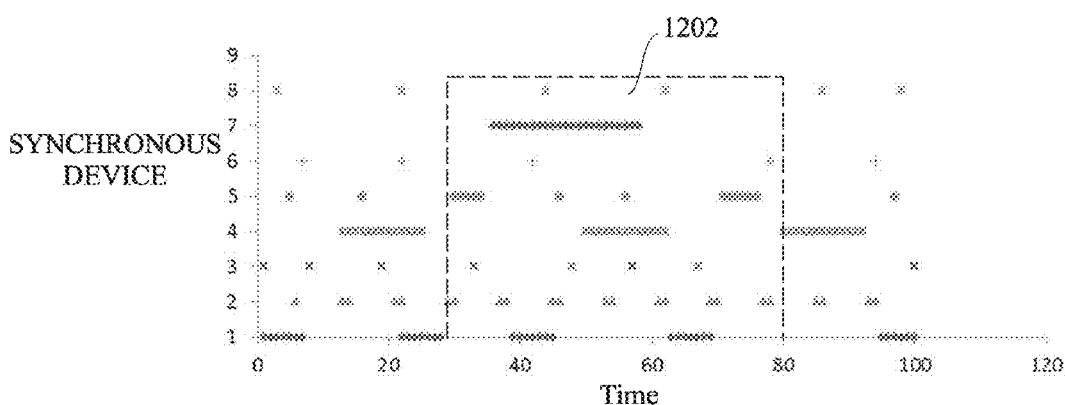
FIG. 12 is a graph illustrating an example of synchronous device activity according to an example embodiment of the present disclosure.

FIG. 12 is a graph illustrating an example of the activity of a few of the synchronous devices 1 to 9 during a particular test pattern according to an example embodiment. For each device, a corresponding mark is for example represented in the graph each time the device is activated with a propagation delay of over a certain threshold, for example over 1200 ps. It will be noted that the synchronous device 2 is a good candidate for being equipped, as it has events occurring at regular intervals throughout the functional test pattern.

Furthermore, in some embodiments the activity of the synchronous devices during the functional test pattern is used to reduce the length of the functional test pattern that will be used during the exploration phase. For example, the pattern is reduced by selecting only one or more sub-portions during which there is relatively high activity among certain synchronous devices to be equipped. For example, as represented by a dashed rectangle 1202, in the example of FIG. 12, a period can be selected during which all of the synchronous devices 1, 2 3, 4, 5 and 7 have relatively high activity.

In some embodiments, the methods described in relation to FIGS. 5 to 12 for selecting synchronous devices to be equipped are repeated for a plurality of operating points of the integrated circuit, in other words for a plurality of clock frequency and PVT (process, voltage, temperature) combinations. Indeed, paths which are the most critical at one operating point may no longer be the most critical paths at another operating point. The synchronous devices to be equipped are for example selected as devices that are commonly identified in the list 514 generated for each operating point.

For at least some synchronous devices, the duration of the slack time may become shorter with time due to aging of the circuit. In some embodiments, the static timing analysis operation 508 of FIGS. 5 and 9B is performed once based on initial performance models of each cell, such that the slack times of each synchronous device correspond to the initial slack times in the circuit before aging. The static timing analysis is then for example repeated based on an aged model version of each cell, which is for example a model representing the performance of the cells after X years, where X is for example between 1 and 10. The synchronous device list is for example generated to include devices that have input paths having not only a relatively low initial slack time, but a slack time that becomes worse with age, in other words that becomes shorter in duration. For example, synchronous devices are selected for which the initial slack time is below a first threshold, and for which the aged slack time is lower than the first threshold by at least a second threshold. Thus if two synchronous devices have the same initial slack time, but the slack times of one of the devices ages worse than that of the other, the one having worse aging is for example selected, as this will provide a better indication of when timing violations may occur due to the aging of the synchronous devices.

In some embodiments, the selection of synchronous devices to be equipped with detection circuits is also based on the physical location of the synchronous devices in the circuit. Indeed, different regions of an integrated circuit may have on-chip variations due to local process variability, local voltage drops, and local temperature variations. Indeed, some regions of an integrated circuit may become hotter than others. At least a certain percentage of the synchronous devices selected to be equipped are for example evenly distributed across the integrated circuit. For example, if an integrated circuit comprises four main sub-circuits, for example processors, a certain percentage, such as around 10 percent, of the synchronous devices are for example selected from each sub-circuit, and a further percentage, such as around 10 percent, are selected from the memory sub-system. In this way, around 50 percent or more of the selected synchronous devices are distributed across the layout of the integrated circuit, and local variations that may affect the slack time of the synchronous devices can also be taken into account.

In some embodiments, the list 514 comprises synchronous devices selected based on one, some or all of the following:
- the slack times of synchronous devices for a plurality of different PVT and frequency levels;
- the aging influence, for example the slack times of synchronous devices with and without aging in the circuit;
- the activity level of the synchronous devices; and
- the physical location of the synchronous devices across the integrated circuit.

An advantage of the methods described for selecting the synchronous devices to be equipped with detection circuits is that they permit devices having relatively critical paths and also relatively high activity to be selected and used. This leads to the advantage that the delays introduced in the detection circuits can be relatively low, and that relatively few detection circuits can provide sufficient warning messages to permit an accurate exploration phase to find the target operating frequency of the integrated circuit.

Having thus described at least one illustrative embodiment, various alterations, modifications and improvements will readily occur to those skilled in the art.

For example, while embodiments have been described in which the significant timing edges of the clock signal are the rising edges, it would be possible to implement circuits in which the significant clock edges are the falling edges, or both rising and falling edges.

Furthermore, it will be apparent to those skilled in the art that the detection circuits of FIGS. 1A and 2A are merely examples, and that other types of detection circuits could be used that provide warnings of timing violations with an appropriate margin.

Furthermore, it will be apparent to those skilled in the art that the various embodiments described in relation to the various embodiments could be combined, in alternative embodiments, in any combination.

The invention claimed is:

1. A method of circuit conception comprising:
    performing static timing analysis on a circuit design to identify a first subset of the synchronous devices having at least one input path with a slack time below a first threshold;
    simulating the circuit design using one or more functional test patterns to identify a second subset of the synchronous devices for which the number of activations during the simulation is above a second threshold;
    selecting at least one synchronous device forming part of both of the first and second subsets; and
    modifying the circuit design to include, for each selected synchronous device, a detection circuit coupled to one or more inputs of the selected synchronous device.

2. The method of claim 1, wherein the detection circuit added to each selected synchronous device is coupled to at least one clock input and at least one data input of the selected synchronous device.

3. The method of claim 1, wherein the simulation is performed on an RTL (register transfer level) representation of the circuit design.

4. The method of claim 1, further comprising, prior to said simulation, defining a layout of the circuit design by performing placement and routing, and determining by timing analysis at least the propagation delays of some or all paths between the synchronous devices, wherein said second subset of synchronous devices are those for which the number of activations during the simulation with a propagation delay of more than a third threshold is above the second threshold.

5. The method of claim 4, wherein said selection comprises selecting a plurality of synchronous devices forming part of both of the first and second subsets based at least partially on the location of the synchronous devices across said layout.

6. The method of claim 4, wherein simulating the circuit design comprises generating code defining a spy register adapted to observe, during the simulation, a clock input and at least one data input of each synchronous device of the first subset.

7. The method of claim 6, further comprising:
    determining a toggle rate associated with each synchronous device of the first subset, the toggle rate indicating the number of data transitions received by the synchronous device during the simulation with propagation delays over the third threshold; and wherein selecting at least one synchronous device forming part of both of the first and second subsets comprises selecting at least one synchronous device having a toggle rate over a fourth threshold.

8. The method of claim 4, wherein each of the paths between synchronous devices of the circuit design comprises one or more cells, the method further comprising, prior to simulating the circuit design, generating a standard delay format timing file indicating a cell delay for each of the cells.

9. The method of claim 1, wherein said timing analysis is based on first performance models of the synchronous devices of the circuit design, the method further comprising:
    performing a further timing analysis of the circuit design to determine the propagation delays of said some or all paths between the synchronous devices based on second performance models of the synchronous devices, the second performance model assuming aging with respect to the first performance model; and
    comparing, for each of the paths, the propagation delay generated by the timing analysis and by the further timing analysis, wherein said second subset of synchronous devices are those for which the time difference between said propagation delays is above a fourth threshold.

10. The method of claim 1, wherein each detection circuit is adapted to activate a warning signal if a data signal on the at least one data input of the selected synchronous device transitions during a detection time window, wherein at least part of the detection time window covers a time period for which a setup-time of the selected synchronous device is not violated.

11. A data storage medium storing thereon instructions that, when executed by a processing device, cause a method of circuit conception to be implemented comprising:
    performing static timing analysis on a circuit design to identify a first subset of the synchronous devices having at least one input path with a slack time below a first threshold;
    simulating the circuit design using one or more functional test patterns to identify a second subset of the synchronous devices for which the number of activations during the simulation is above a second threshold;
    selecting at least one synchronous device forming part of both of the first and second subsets; and
    modifying the circuit design to include, for each selected synchronous device, a detection circuit coupled to one or more inputs of the selected synchronous device.

12. A device for circuit conception comprising:
a memory storing a circuit design comprising synchronous devices; and
a processing device adapted to:
perform static timing analysis on a circuit design to identify a first subset of the synchronous devices having at least one input path with a slack time below a first threshold;
simulate the circuit design using one or more functional test patterns to identify a second subset of the synchronous devices for which the number of activations during the simulation is above a second threshold;
select at least one synchronous device forming part of both of the first and second subsets; and
modify the circuit design to include, for each selected synchronous device, a detection circuit coupled to one or more inputs of the selected synchronous device.

\* \* \* \* \*